United States Patent
Saeki

(10) Patent No.: US 9,413,283 B2
(45) Date of Patent: Aug. 9, 2016

(54) MOTOR CONTROL SYSTEM, CONTROL DEVICE, AND CONTROL METHOD

(71) Applicant: KABUSHIKI KAISHA YASKAWA DENKI, Kitakyushu-shi (JP)

(72) Inventor: Takahiro Saeki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 51 days.

(21) Appl. No.: 14/556,244

(22) Filed: Dec. 1, 2014

(65) Prior Publication Data

US 2015/0188478 A1  Jul. 2, 2015

(30) Foreign Application Priority Data

Dec. 26, 2013 (JP) .................. 2013-270059

(51) Int. Cl.
*H02P 27/04* (2016.01)
*H02P 25/02* (2016.01)
*H02P 27/08* (2006.01)
(Continued)

(52) U.S. Cl.
CPC ............... *H02P 25/02* (2013.01); *H02M 5/458* (2013.01); *H02M 7/493* (2013.01); *H02P 5/74* (2013.01); *H02P 27/08* (2013.01); *H02P 29/025* (2013.01); *H02M 2001/008* (2013.01); *H02M 2001/0025* (2013.01); *H02P 31/00* (2013.01)

(58) Field of Classification Search
CPC .......... H02P 25/02; H02P 27/08; H02P 27/04
USPC .......... 318/3, 5, 8, 560, 568.18, 606, 607, 34, 318/78, 49, 51, 53, 101, 120, 147, 149, 318/400.01, 400.14, 700, 727, 799, 800, 318/801, 432, 805, 807, 812; 388/800, 814, 388/820, 908; 361/40, 44, 95; 363/40, 44, 363/95, 120

See application file for complete search history.

(56) References Cited

U.S. PATENT DOCUMENTS

| 4,673,858 A * | 6/1987 | Saito | H02P 27/047 318/798 |
| 6,684,788 B2 * | 2/2004 | Ohno | B41F 33/12 101/484 |

(Continued)

FOREIGN PATENT DOCUMENTS

| EP | 1266755 | 12/2002 |
| JP | 4-146223 | 5/1992 |

(Continued)

OTHER PUBLICATIONS

Japanese Office Action for corresponding JP Application No. 2013-270059, Nov. 4, 2015 (w/ machine translation).

(Continued)

*Primary Examiner* — Antony M Paul
(74) *Attorney, Agent, or Firm* — Mori & Ward, LLP

(57) ABSTRACT

A motor control system includes a plurality of motors, a plurality of inverters, and a controller. The plurality of inverters are configured to drive the plurality of respective motors and are coupled to a common bus line through which DC power is supplied. When power supply is interrupted, the controller is configured to calculate a frequency command value so as to maintain a bus line voltage across the common bus line and configured to supply the frequency command value to the plurality of inverters.

8 Claims, 3 Drawing Sheets

(51) Int. Cl.
*H02P 29/02* (2016.01)
*H02M 5/458* (2006.01)
*H02M 7/493* (2007.01)
*H02P 5/74* (2006.01)
*H02M 1/00* (2006.01)
*H02P 31/00* (2006.01)

(56) References Cited

U.S. PATENT DOCUMENTS 6,909,254 B2 * 6/2005 Saari .................. H02P 5/74
318/432

8,076,896 B2 * 12/2011 Yamamoto ............ H02P 29/032
318/400.07

FOREIGN PATENT DOCUMENTS

| | | |
|---|---|---|
| JP | 2000-354396 | 12/2000 |
| JP | 2002-223592 | 8/2002 |
| JP | 2010-076155 | 4/2010 |
| WO | WO 03/003558 | 1/2003 |

OTHER PUBLICATIONS

Extended European Search Report for corresponding EP Application No. 14194888.5-1809, Jun. 29, 2015.

* cited by examiner

MOTOR CONTROL SYSTEM, CONTROL DEVICE, AND CONTROL METHOD

CROSS-REFERENCE TO RELATED APPLICATIONS

The present application claims priority under 35 U.S.C. §119 to Japanese Patent Application No. 2013-270059, filed Dec. 26, 2013. The contents of this application are incorporated herein by reference in their entirety.

BACKGROUND

1. Field of the Invention

The embodiments disclosed herein relate to a motor control system, a control device, and a control method.

2. Discussion of the Background

Japanese Unexamined Patent Application Publication No. 2002-223592 discloses a spinning system in which a plurality of motors cooperate with each other to spin yarns. When an instantaneous power failure occurs in the spinning system, the motors are decelerated, and resulting regeneration energy is utilized in KEB (Kinetic Energy Back-up) control. In the KEB control, the plurality of motors are decelerated while being kept at a same speed in order to eliminate or minimize a yarn breakage.

SUMMARY

According to one aspect of the present disclosure, a motor control system includes a plurality of motors, a plurality of inverters, and a controller. The plurality of inverters are configured to drive the plurality of respective motors and are coupled to a common bus line through which DC power is supplied. When power supply is interrupted, the controller is configured to calculate a frequency command value so as to maintain a bus line voltage across the common bus line and configured to supply the frequency command value to the plurality of inverters.

According to another aspect of the present disclosure, a control device is configured to control a plurality of inverters configured to drive a plurality of motors and coupled to a common bus line through which DC power is supplied. When power supply is interrupted, the control device is configured to calculate a frequency command value so as to maintain a bus line voltage across the common bus line. The control device is configured to supply the frequency command value to the plurality of inverters.

According to another aspect of the present disclosure, a control device is configured to control a converter and an inverter. The converter is configured to convert AC power into DC power and includes a switching element. The inverter is configured to drive a motor and coupled to a bus line through which the DC power is supplied. While the AC power is supplied, the control device is configured to calculate a current target value to be supplied to a capacitor and the inverter. The capacitor is disposed at a common bus line so as to maintain a bus line voltage across the bus line. The control device is configured to control the converter based on the current target value. When supply of the AC power is interrupted, the control device is configured to calculate a frequency command value so as to maintain the bus line voltage across the bus line. The control device is configured to supply the frequency command value to the inverter.

According to the other aspect of the present disclosure, a control method is for controlling a plurality of inverters coupled to a common bus line through which DC power is supplied. The plurality of inverters are configured to drive a plurality of motors. The method includes calculating a frequency command value to maintain a bus line voltage across the common bus line when power supply is interrupted. The frequency command value is supplied to the plurality of inverters.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
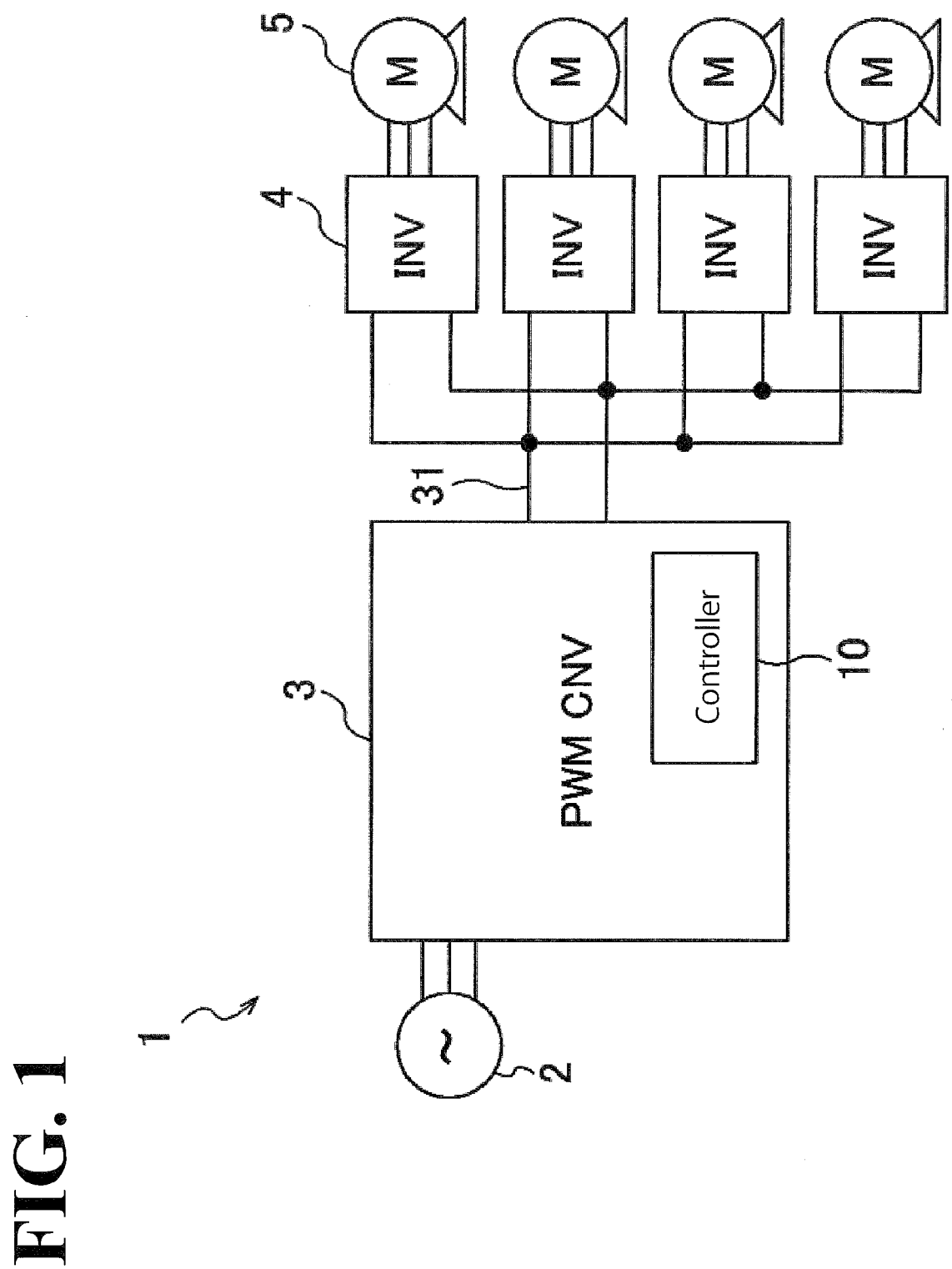
FIG. 1 is a block diagram illustrating a motor control system according to an embodiment of the present invention.

The embodiments will now be described in detail with reference to the accompanying drawings, wherein like reference numerals designate corresponding or identical elements throughout the various drawings.

FIG. 1 is a block diagram illustrating a motor control system 1 according to an embodiment of the present disclosure. The motor control system 1 includes an AC (Alternating Current) power source 2, a PWM converter 3, a plurality of inverters 4, a plurality of motors 5, and a controller 10. The PWM converter 3 is coupled to the AC power source 2. A bus line 31 extends from the PWM converter 3, and the plurality of inverters 4 each are coupled to the common bus line 31. The plurality of motors 5 are respectively coupled to the plurality of inverters 4. The controller 10 is disposed at the PWM converter 3.

When AC power is supplied from the AC power source 2, the PWM converter 3 converts the AC power into DC (Direct Current) power and supplies the converted DC power to the plurality of inverters 4. The PWM converter 3 includes a conversion circuit including a switching element such as an IGBT. The controller 10 performs PWM control, and based on the PWM control, the PWM converter 3 converts the AC power into DC power.

The PWM converter 3 should not be construed in a limiting sense. Other possible examples of the converter including a switching element and to be controlled by the controller include, but are not limited to, a 120-degree regeneration converter and a thyristor converter. It is also possible to use a converter that uses a diode bridge and is not provided with a controller.

When DC power is supplied from the PWM converter 3, the inverters 4 each convert DC power into AC power and supply the converted AC power to the respective motors 5. Based on a frequency command value supplied from the controller 10 of the PWM converter 3, the inverters 4 control rotation of the respective motors 5. An example of the motor 5 is an induction motor.

The controller 10 according to this embodiment corresponds to the control device. An example of the controller 10 is a microprocessor to perform information processing based on a program stored in the memory. While AC power is supplied from the AC power source 2 (hereinafter referred to as normal state), the controller 10 controls the PWM converter 3 by PWM control.

When supply of AC power from the AC power source 2 is interrupted (hereinafter referred to as instantaneous power failure state), the controller 10 decelerates the plurality of motors 5, and performs KEB control including generating a common frequency command value to obtain regeneration energy, and supplying the common frequency command value to the plurality of inverters 4. The KEB control performed in instantaneous power failure state will be described below.

Figure 2:
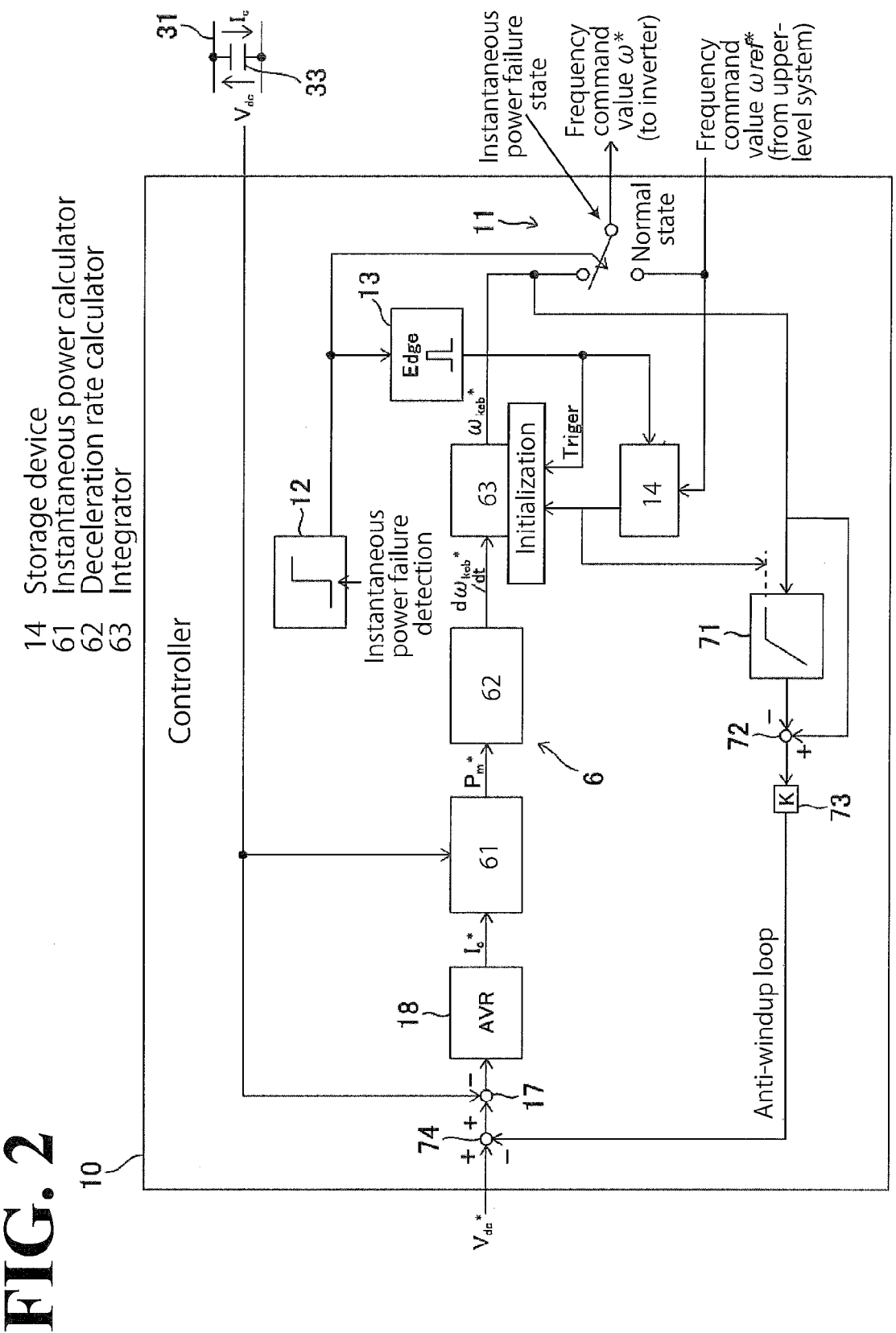
FIG. 2 is a block diagram illustrating an exemplary controller.

FIG. 2 is a block diagram illustrating an example of the controller 10. The controller 10 performs various kinds of control, among which FIG. 2 illustrates blocks related to KEB control performed in instantaneous power failure state. All blocks except for a storage device 14 are implemented by the microprocessor performing information processing based on a program stored in the memory.

The controller 10 receives a bus line voltage detection value $V_{dc}$, a bus line voltage command value $V_{dc}^*$, and a frequency command value $\omega_{ref}^*$. The bus line voltage detection value $V_{dc}$ is a detection value of a bus line voltage applied across a capacitor 33, which is coupled to the bus line 31. The bus line voltage command value $V_{dc}^*$ is a command value of the bus line voltage. The frequency command value $\omega_{ref}^*$ is supplied from an upper-level system. The controller 10 outputs a frequency command value $\omega^*$ to the plurality of inverters 4.

The controller 10 includes a switch 11, an instantaneous power failure detector 12, an edge detector 13, the storage device 14, a subtractor 17, a voltage adjustor 18, an instantaneous power calculator 61, a deceleration rate calculator 62, an integrator 63, a limiter 71, a subtractor 72, a multiplier 73, and a subtractor 74.

Based on a detection signal from the instantaneous power failure detector 12, the switch 11 switches between values of the frequency command value $\omega^*$, which is output by the controller 10. In normal state, the frequency command value $\omega_{ref}^*$, which is supplied from the upper-level system, itself is output as the frequency command value $\omega^*$. In instantaneous power failure state, a frequency command value $\omega_{keb}^*$, which is from the integrator 63, is output as the frequency command value $\omega^*$.

The instantaneous power failure detector 12 monitors power supply from the AC power source 2, and outputs a detection signal to the switch 11 and the edge detector 13. An example of the detection signal is a binary signal that changes in value between normal state and instantaneous power failure state. The instantaneous power failure detector 12 outputs a detection signal when, for example, the bus line voltage detection value $V_{dc}$ falls below a rated voltage (for example, 200 V). Another possible example is that the instantaneous power failure detector 12 outputs a detection signal when a power source voltage detection value falls below 70% of the rated voltage.

When the edge detector 13 detects an edge of switch from normal state to instantaneous power failure state in the detection signal from the instantaneous power failure detector 12, the edge detector 13 outputs a trigger signal of initialization to the integrator 63 and the storage device 14.

The storage device 14 receives the frequency command value $\omega_{ref}^*$ input from the upper-level system, and stores the frequency command value $\omega_{ref}^*$ as of the time of receipt of the trigger signal from the edge detector 13. The storage device 14 outputs this frequency command value $\omega_{ref}^*$ to the integrator 63 and the limiter 71.

When the integrator 63 receives the trigger signal from the edge detector 13, the integrator 63 sets the frequency command value $\omega_{ref}^*$ (as of the time of receipt of the trigger signal) stored in the storage device 14 as an initial value of the frequency command value $\omega_{keb}^*$.

The subtractor 17 calculates a difference between the bus line voltage command value $V_{dc}^*$ (specifically, a value resulting from a subtraction at the subtractor 74) and the bus line voltage detection value $V_{dc}$, and outputs the difference to the voltage adjustor 18.

The voltage adjustor 18 (AVR: Auto Voltage Regulation) is an example of the current target value calculator. The voltage adjustor 18 calculates a current target value $I_c^*$ to eliminate or minimize the difference output from the subtractor 17, and outputs the current target value $I_c^*$ to the instantaneous power calculator 61. As used herein, the current target value $I_c^*$ is a target value of the current $I_c$ that should be applied to the capacitor 33 so as to maintain the bus line voltage detection value $V_{dc}$ at the bus line voltage command value $V_{dc}^*$.

The instantaneous power calculator 61 is an example of the power target value calculator. The instantaneous power calculator 61 multiplies the current target value $I_c^*$, which is output from the voltage adjustor 18, by the bus line voltage detection value $V_{dc}$ so as to calculate a power target value $P_m^*$. Then, the instantaneous power calculator 61 outputs the power target value $P_m^*$ to the deceleration rate calculator 62.

Based on the power target value $P_m^*$, which is output from the instantaneous power calculator 61, the deceleration rate calculator 62 calculates a deceleration rate (acceleration target value) $d\omega_{keb}^*/dt$ and outputs the deceleration rate $d\omega_{keb}^*/dt$ to the integrator 63. Specifically, the deceleration rate calculator 62 calculates the deceleration rate $d\omega_{keb}^*/dt$ so as to make the regeneration energy resulting from deceleration of the motors 5 meet the power target value $P_m^*$.

The integrator 63 is an example of the frequency command value calculator. The integrator 63 integrates the deceleration rate $d\omega_{keb}^*/dt$, which is output from the deceleration rate calculator 62, to calculate the frequency command value $\omega_{keb}^*$, and outputs the frequency command value $\omega_{keb}^*$ to the inverter 4, the limiter 71, and the subtractor 72.

The instantaneous power calculator 61, and the deceleration rate calculator 62, and the integrator 63 correspond to a power interruption time controller 6. The power interruption time controller 6 calculates the frequency command value $\omega_{keb}^*$ in instantaneous power failure state based on the current target value $I_c^*$, which is output from the voltage adjustor 18.

The limiter 71, the subtractor 72, the multiplier 73, and the subtractor 74 form an anti-windup loop to keep the frequency command value $\omega_{keb}^*$ under a predetermined upper limit.

As the upper limit of the frequency command value $\omega_{keb}^*$, the limiter 71 outputs the frequency command value $\omega_{ref}^*$ (as of the time of receipt of the trigger signal) stored in the storage device 14 to the subtractor 72. When the frequency command value $\omega_{keb}^*$, which is from the integrator 63, is equal to or less than a predetermined value, the limiter 71 linearly changes the upper limit of the frequency command value $\omega_{keb}^*$.

The subtractor 72 calculates a difference (excessive value above the upper limit) by subtracting the upper limit of the frequency command value $\omega_{keb}^*$ output from the limiter 71 from the frequency command value $\omega_{keb}^*$ output from the integrator 63. Then, the subtractor 72 outputs the difference to the multiplier 73.

The multiplier 73 calculates a product of the difference output from the subtractor 72 and a gain K, and outputs the product to the subtractor 74.

The subtractor 74 calculates a difference by subtracting the product output from the multiplier 73 from the bus line voltage command value $V_{dc}^*$, and outputs the difference to the subtractor 17.

While the blocks to implement the KEB control in instantaneous power failure state may be included in a control device, not illustrated, provided in one inverter among the plurality of inverters 4 or may be included in a device separate from the PWM converter 3 and the inverters 4.

The KEB control in instantaneous power failure state will be described in detail below.

First, in the capacitor 33 coupled to the bus line 31, a relationship as represented by the following Formula 1 is established. $V_{dc}$ denotes a bus line voltage (bus line voltage detection value) applied across the capacitor 33, $I_c$ denotes current flowing through the capacitor 33, C denotes capacity of the capacitor 33, and s denotes a Laplace operator.

$$V_{dc} = \frac{1}{Cs} I_c \quad \text{[Formula 1]}$$

Next, a relationship of power in instantaneous power failure state is represented by the following Formula 2. ω denotes rotational speed of the motor 5, T denotes torque of the motor 5, and $P_{loss}$ denotes a loss inherent in the system.

$$\omega T = V_{dc} I_c + P_{loss} \quad \text{[Formula 2]}$$

In this embodiment, $P_{loss}=0$. This leads to the following Formula 3.

$$\omega T = V_{dc} I_c \quad \text{[Formula 3]}$$

As indicated in Formula 1, controlling the current $I_c$ flowing through the capacitor 33 ensures controlling the bus line voltage $V_{dc}$ applied across the capacitor 33.

In view of this, the current target value $I_c^*$ to maintain the bus line voltage $V_{dc}$ by PI control is calculated. The current target value $I_c^*$ is represented by the following Formula 4. In Formula 4, $V_{dc}^*$ denotes a bus line voltage command value, and $K_p$ denotes a gain.

$$I_c^* = K_p \left(1 + \frac{1}{T_i s}\right)(V_{dc}^* - V_{dc}) \quad \text{[Formula 4]}$$

The current target value $I_c^*$ represented by Formula 4 is calculated at the voltage adjustor 18 (AVR: Auto Voltage Regulation).

Incidentally, since it is impossible to directly control the current $I_c$ flowing through the capacitor 33, the following description will be regarding indirectly controlling the current $I_c$ by controlling the power $P_m$ generated by the motor 5.

The power at the side of the capacitor 33 is equal to the power $P_m$ at the side of the motor 5. Hence, the following Formula 5 is established.

$$P_m = V_{dc} I_c \quad \text{[Formula 5]}$$

From Formula 5, the power target value $P_m^*$, which is a target value of the power $P_m$ to be generated by the motor 5, is obtained as represented by the following Formula 6.

$$P_m^* = V_{dc} I_c^* \quad \text{[Formula 6]}$$

The power target value $P_m^*$ represented by Formula 6 is calculated at the instantaneous power calculator 61.

The power $P_m$ generated by the motor 5 has a relationship as represented by the following Formula 7.

$$P_m = \omega T \quad \text{[Formula 7]}$$

As indicated in Formula 7, controlling the rotational speed co or controlling the torque T of the motor 5 ensures controlling the power $P_m$ generated by the motor 5.

In view of this, the following description will be regarding controlling the power $P_m$ generated by the motor 5 by controlling the rotational speed ω of the motor 5.

First, the torque T of the motor 5 has a relationship as represented by the following Formula 8. In Formula 8, $J_m$ denotes mechanical inertia of the motor 5.

$$T = J_m \frac{d\omega}{dt} \quad \text{[Formula 8]}$$

From Formulas 7 and 8, a torque target value $T_{ref}^*$, which is the target value of the torque $T_{ref}$ is represented by the following Formula 9. In Formula 9, $\omega_{keb}^*$ denotes a frequency command value, and $d\omega_{keb}^*/dt$ denotes deceleration rate.

$$T_{ref}^* = \frac{1}{\omega} P_m^* = \frac{1}{\omega} \omega T_{ref}^* = T_{ref}^* = J_m \frac{d\omega_{keb}^*}{dt} \quad \text{[Formula 9]}$$

Developing Formula 9 leads to the following Formula 10, which represents the deceleration rate $d\omega_{keb}^*/dt$.

$$\frac{d\omega_{keb}^*}{dt} = \frac{1}{J_m \omega} P_m^* \quad \text{[Formula 10]}$$

The deceleration rate $d\omega_{keb}^*/dt$ represented by Formula 10 is calculated at the deceleration rate calculator 62.

Integrating Formula 10 leads to the following Formula 11, which represents the frequency command value $\omega_{keb}^*$.

$$\omega_{keb}^* = \int \frac{d\omega_{keb}^*}{dt} \cdot dt \quad \text{[Formula 11]}$$

The frequency command value $\omega_{keb}^*$ represented by Formula 11 is calculated at the integrator 63.

Thus, calculating the frequency command value $\omega_{keb}^*$ ensures eliminating or minimizing an excessive increase in the regeneration energy while the plurality of motors 5 are decelerated at the same speed.

Figure 3:
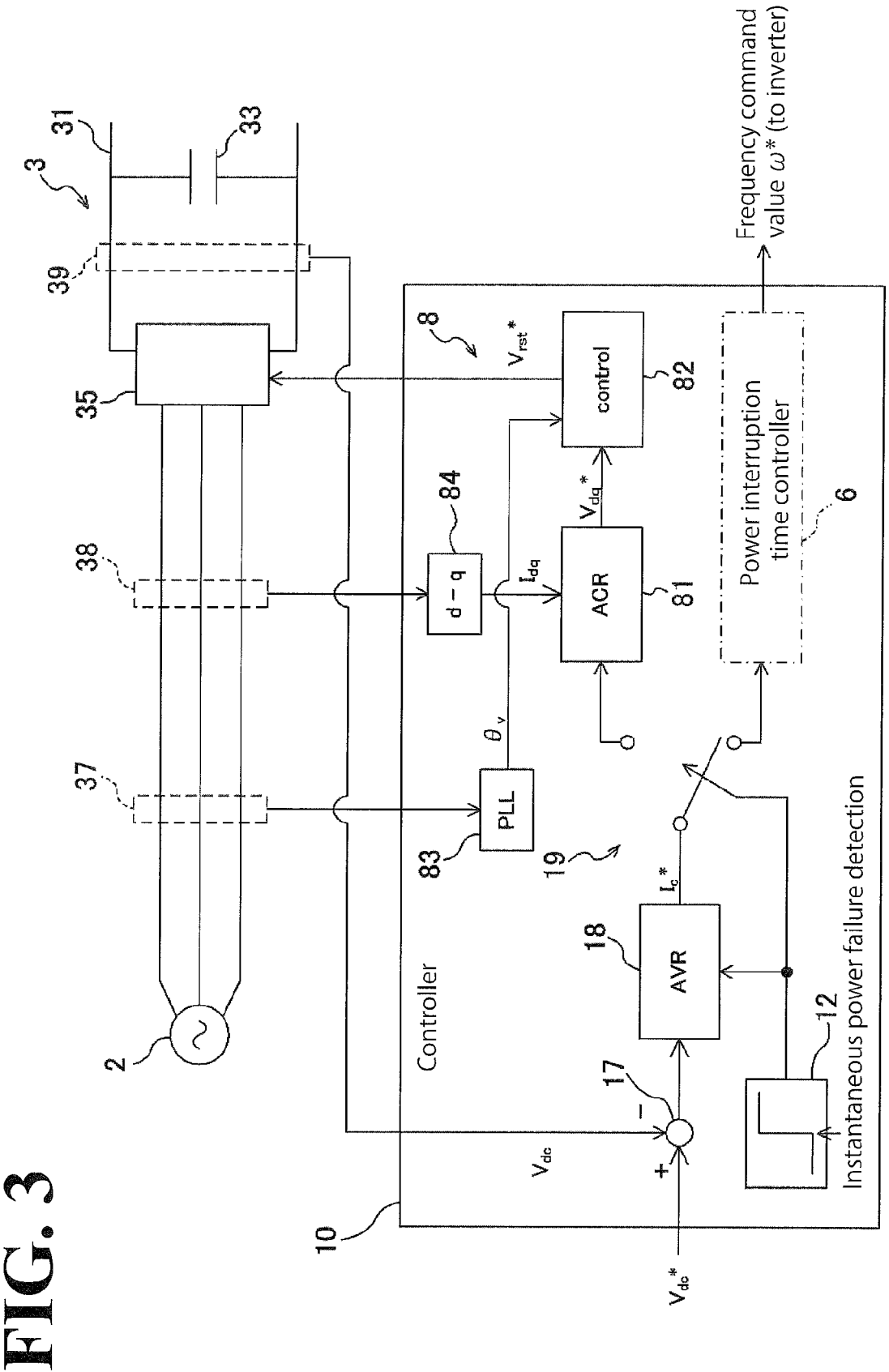
FIG. 3 is a block diagram illustrating another exemplary controller.

FIG. 3 is a block diagram illustrating another example of the controller 10. The controller 10 performs various kinds of control, among which FIG. 3 illustrates blocks related to the PWM control performed in normal state and blocks related to the KEB control performed in instantaneous power failure state. Like reference numerals designate corresponding or identical elements throughout this and above embodiments, and these elements will not be elaborated here.

The PWM converter 3 includes a conversion circuit 35. The conversion circuit 35 includes a switching element such as an IGBT. The controller 10 performs PWM control, and based on the PWM control, the PWM converter 3 converts AC power into DC power.

The PWM converter 3 also includes a voltage detector 37 and a current detector 38. The voltage detector 37 detects the voltage of AC power supplied from the AC power source 2. The current detector 38 detects the current of AC power supplied from the AC power source 2. The voltage detector 37 and the current detector 38 output detection signals to the controller 10.

The PWM converter 3 includes a voltage detector 39. The voltage detector 39 detects the bus line voltage applied across the capacitor 33, which is coupled to the bus line 31. The voltage detector 39 outputs a detection signal to the controller 10.

The controller 10 includes a switch 19, a current adjustor 81, a conversion controller 82, a PLL circuit 83, and a d-q converter 84. Also the controller 10 includes the instantaneous power failure detector 12, the subtractor 17, the voltage adjustor 18, and the power interruption time controller 6. This configuration should not be construed as limiting the controller 10, and the controller 10 may also include any other blocks such as those illustrated in FIG. 2.

The current adjustor 81 and the conversion controller 82 correspond to a power supply time controller 8. The power supply time controller 8 controls the PWM converter 3 in normal state based on the current target value $I_c{}^*$, which is output from the voltage adjustor 18.

Based on the detection signal output from the instantaneous power failure detector 12, the switch 19 switches between destinations to which the current target value $I_c{}^*$ is supplied from the voltage adjustor 18. In normal state, the current target value $I_c{}^*$ is supplied to the power supply time controller 8. In instantaneous power failure state, the current target value $I_c{}^*$ is supplied to the power interruption time controller 6.

In other words, the switch 19 activates the power supply time controller 8 in normal state, while in instantaneous power failure state, the switch 19 activates the power interruption time controller 6.

Based on the detection signal output from the instantaneous power failure detector 12, the voltage adjustor 18 switches between methods of calculating the current target value $I_c{}^*$. In normal state, the voltage adjustor 18 adds an inverter current component to a capacitor current component, and makes the sum the current target value $I_c{}^*$. The capacitor current component is a component that should be supplied to the capacitor 33 so as to maintain the bus line voltage detection value $V_{dc}$ at the bus line voltage command value $V_{dc}{}^*$. The inverter current component is a component that should be supplied to the inverter 4. The configuration in instantaneous power failure state is as described above.

The current adjustor 81 (ACR: Auto Current Regulation) calculates a voltage target value $V_{dq}{}^*$. The voltage target value $V_{dq}{}^*$ is used to eliminate or minimize the difference between the current target value $I_c{}^*$, which is output from the voltage adjustor 18, and a current detection value $I_{dq}$, which is output from the d-q converter 84. Then, the current adjustor 81 outputs the voltage target value $V_{dq}{}^*$ to the conversion controller 82.

Based on the voltage target value $V_{dq}{}^*$ output from the current adjustor 81 and a phase $\theta_v$ output from the PLL circuit 83, the conversion controller 82 calculates a control signal $V_{rst}{}^*$ to control the conversion circuit 35 by PWM control, and outputs the control signal $V_{rst}{}^*$ to the conversion circuit 35.

Based on the detection signal output from the voltage detector 37, the PLL circuit 83 calculates a phase $\theta_v$ of AC power supplied from the AC power source 2, and outputs the phase $\theta_v$ to the conversion controller 82.

Based on the detection signal output from the current detector 38, the d-q converter 84 calculates the current detection value $I_{dq}$ resulting from d-q conversion, and outputs the current detection value $I_{dq}$ to the current adjustor 81.

This embodiment ensures that the controller 10 performs PWM control of the PWM converter 3 in normal state, and performs KEB control of the motors 5 in instantaneous power failure state.

In particular, in this embodiment, the subtractor 17 and the voltage adjustor 18 are used in both the PWM control in normal state and the KEB control in instantaneous power failure state, that is, the subtractor 17 and the voltage adjustor 18 are a configuration common to the PWM control in normal state and the KEB control in instantaneous power failure state. This simplifies the controller 10.

In this embodiment, the inverter 4 and the motor 5 each may be provided in singular form.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A motor control system comprising:
   a plurality of motors;
   a plurality of inverters configured to drive the plurality of respective motors and coupled to a common bus line through which DC power is supplied; and
   a controller configured to, when power supply is interrupted, calculate a frequency command value so as to maintain a bus line voltage across the common bus line and configured to supply the frequency command value to the plurality of inverters,
   wherein the controller comprises:
      a current target value calculator configured to calculate a current target value of a capacitor disposed at the common bus line so as to maintain the bus line voltage;
      a power target value calculator configured to calculate a power target value of the capacitor based on the bus line voltage and the current target value of the capacitor; and
      a frequency command value calculator configured to calculate the frequency command value based on the power target value of the capacitor.

2. The motor control system according to claim 1, wherein the controller is configured to keep the frequency command value under a predetermined upper limit.

3. A motor control system comprising:
   a plurality of motors;
   a plurality of inverters configured to drive the plurality of respective motors and coupled to a common bus line through which DC power is supplied;
   a controller configured to, when power supply is interrupted, calculate a frequency command value so as to maintain a bus line voltage across the common bus line and configured to supply the frequency command value to the plurality of inverters; and
   a converter comprising a switching element and being configured to convert AC power into the DC power,
   wherein while the AC power is supplied, the controller is configured to calculate a current target value to be supplied to a capacitor and to the plurality of inverters, the capacitor being disposed at the common bus line so as to maintain the bus line voltage across the common bus line, and
   wherein the controller is configured to control the converter based on the current target value.

4. The motor control system according to claim 3, wherein the controller comprises
   a power supply time controller configured to, while the AC power is supplied, control the converter based on the current target value to be supplied to the capacitor and to the plurality of inverters so as to maintain the bus line voltage, and a power interruption time controller configured to, when supply of the AC power is interrupted, calculate a frequency command value to be supplied to the plurality of inverters based on the current target value to be supplied to the capacitor so as to maintain the bus line voltage.

5. A control device, wherein the control device is configured to control a converter and an inverter, the converter being configured to convert AC power into DC power and comprising a switching element, the inverter being configured to drive a motor and coupled to a bus line through which the DC power is supplied, wherein while the AC power is supplied, the control device is configured to calculate a current target value to be supplied to a capacitor and the inverter, the capacitor being disposed at a common bus line so as to maintain a bus line voltage across the bus line, wherein the control device is configured to control the converter based on the current target value, wherein when supply of the AC power is interrupted, the control device is configured to calculate a frequency command value so as to maintain the bus line voltage across the bus line, and wherein the control device is configured to supply the frequency command value to the inverter.

6. The control device according to claim 5, comprising:

a power supply time controller configured to, while the AC power is supplied, control the converter based on the current target value to be supplied to the capacitor and to the inverter so as to maintain the bus line voltage; and a power interruption time controller configured to, when supply of the AC power is interrupted, calculate the frequency command value to be supplied to a plurality of the inverters based on the current target value to be supplied to the capacitor so as to maintain the bus line voltage.

7. A control method for controlling a plurality of inverters coupled to a common bus line through which DC power is supplied, the plurality of inverters being configured to drive a plurality of motors, the method comprising:

calculating a frequency command value to maintain a bus line voltage across the common bus line when power supply is interrupted; and supplying the frequency command value to the plurality of inverters, wherein the calculating of the frequency command value comprises:

calculating a current target value of a capacitor disposed at the common bus line so as to maintain the bus line voltage;

calculating a power target value of the capacitor based on the bus line voltage and the current target value of the capacitor; and calculating the frequency command value based on the power target value of the capacitor.

8. A motor control system comprising:

a plurality of motors;

a plurality of inverters configured to drive the plurality of respective motors and coupled to a common bus line through which DC power is supplied; and controlling means for, when power supply is interrupted, calculating a frequency command value so as to maintain a bus line voltage across the common bus line and for supplying the frequency command value to the plurality of inverters, wherein the controlling means comprises:

current target value calculating means for calculating a current target value of a capacitor disposed at the common bus line so as to maintain the bus line voltage;

power target value calculating means for calculating a power target value of the capacitor based on the bus line voltage and the current target value of the capacitor; and frequency command value calculating means for calculating the frequency command value based on the power target value of the capacitor.

* * * * *